(12) United States Patent
Haghighat

(10) Patent No.: US 7,660,344 B2
(45) Date of Patent: Feb. 9, 2010

(54) AGC FINE-TUNING BY THE ADAPTIVE TIME DOMAIN EQUALIZER

(75) Inventor: Afshin Haghighat, Pierrefonds (CA)

(73) Assignee: BWA Technology, Inc., Las Vegas, NV (US)

( * ) Notice: Subject to any disclaimer, the term of this patent is extended or adjusted under 35 U.S.C. 154(b) by 240 days.

(21) Appl. No.: 10/183,161

(22) Filed: Jun. 28, 2002

(65) Prior Publication Data
US 2004/0001541 A1    Jan. 1, 2004

(51) Int. Cl.
*H04B 1/38* (2006.01)
*H04L 5/16* (2006.01)

(52) U.S. Cl. ............... 375/222; 375/232; 375/345; 375/350

(58) Field of Classification Search ........ 375/219, 375/222, 229, 232, 259, 316, 345, 285, 350; 455/284, 296, 305, 234.1, 245.1
See application file for complete search history.

(56) References Cited

U.S. PATENT DOCUMENTS

| | | | | |
|---|---|---|---|---|
| 4,683,578 A * | 7/1987 | Betts et al. | ............ | 375/345 |
| 4,775,988 A * | 10/1988 | Chevillat et al. | ............ | 375/345 |
| 4,796,279 A * | 1/1989 | Betts et al. | ............ | 375/229 |
| 4,803,438 A * | 2/1989 | Mizoguchi | ............ | 329/310 |
| 4,868,850 A * | 9/1989 | Kaku et al. | ............ | 375/231 |
| 4,870,370 A * | 9/1989 | Hedberg et al. | ............ | 330/133 |
| 5,018,166 A * | 5/1991 | Tjahjadi et al. | ............ | 375/232 |
| 5,083,304 A * | 1/1992 | Cahill | ............ | 375/345 |
| 5,119,401 A * | 6/1992 | Tsujimoto | ............ | 375/233 |
| 5,241,688 A * | 8/1993 | Arora | ............ | 455/502 |
| 5,274,670 A * | 12/1993 | Serizawa et al. | ............ | 375/231 |
| 5,483,552 A * | 1/1996 | Shimazaki et al. | ............ | 375/233 |
| 5,509,030 A * | 4/1996 | Mortensen | ............ | 375/232 |
| 5,838,744 A * | 11/1998 | Zheng | ............ | 375/355 |
| 5,870,438 A * | 2/1999 | Olafsson | ............ | 375/344 |
| 5,896,423 A * | 4/1999 | Okamoto | ............ | 375/345 |
| 5,949,821 A * | 9/1999 | Emami et al. | ............ | 375/235 |
| 5,978,415 A * | 11/1999 | Kobayashi et al. | ............ | 375/230 |
| 5,999,578 A * | 12/1999 | Ha | ............ | 375/345 |
| 6,009,132 A * | 12/1999 | Scholtz | ............ | 375/355 |
| 6,049,361 A * | 4/2000 | Kim | ............ | 348/678 |
| 6,148,046 A * | 11/2000 | Hussein et al. | ............ | 375/345 |
| 6,208,288 B1* | 3/2001 | Shoucri et al. | ............ | 342/179 |

(Continued)

OTHER PUBLICATIONS

Reeve, H.C., Transversal Equalizer for Digital Radios, Nov. 27-30, 1989, Globecom 1989, Conference Proceedings, vol. 1, 11.7.1-11.7.5, pp. 1-5.*

(Continued)

*Primary Examiner*—Jean B Corrielus
(74) *Attorney, Agent, or Firm*—Sheppard, Mullin, Richter & Hampton LLP

(57) ABSTRACT

A method of improvement for gain control for a Quadrature Amplitude Modulation (QAM) signal within a communication system with at least one digital modem. The communication system utilizes a non-decision aided AGC at the intermediate frequency level and a modified Adaptive Time Domain Equalizer (ADTE) to fine tune the level of baseband signals, perform phase and amplitude correction, and channel equalization. The center tap coefficients of or dynamically modified by the ADTE. The resynchronization time and phase and amplitude imbalance correction will be reduced as a consequence of the controlling of the signal gain by a non-decision aided automatic gain controller.

12 Claims, 5 Drawing Sheets

U.S. PATENT DOCUMENTS

| | | | |
|---|---|---|---|
| 6,243,577 B1 * | 6/2001 | Elrefaie et al. | 455/426.2 |
| 6,442,217 B1 * | 8/2002 | Cochran | 375/326 |
| 6,459,687 B1 * | 10/2002 | Bourlas et al. | 370/328 |
| 6,510,150 B1 * | 1/2003 | Ngo | 370/347 |
| 6,510,188 B1 * | 1/2003 | Isaksen et al. | 375/345 |
| 6,597,733 B2 * | 7/2003 | Pollmann et al. | 375/222 |
| 6,603,818 B1 * | 8/2003 | Dress et al. | 375/295 |
| 6,836,184 B1 * | 12/2004 | Daughtry et al. | 330/144 |
| 6,856,655 B1 * | 2/2005 | Garcia | 375/326 |
| 6,870,880 B2 * | 3/2005 | Tokunaga et al. | 375/229 |
| 6,907,048 B1 * | 6/2005 | Treadaway et al. | 370/474 |
| 6,985,523 B2 * | 1/2006 | Sims et al. | 375/232 |
| 2001/0024475 A1 * | 9/2001 | Kumar | 375/270 |
| 2002/0118741 A1 * | 8/2002 | Tokunaga et al. | 375/229 |
| 2002/0137510 A1 * | 9/2002 | Sims et al. | 455/427 |

OTHER PUBLICATIONS

Yom et al, A 55 Mbaud Single Chip Complex Adaptive Transversal Equalizer for Digital Wireless Communications systems, 1997, Proceedings of the IEEE, pp. 151-154.*

* cited by examiner

\# : Constellation for +2dB change in basband level,
- : Constellation for -2dB change in baseband level,
o : The converged output of the ATDE for the two above cases.

AGC FINE-TUNING BY THE ADAPTIVE TIME DOMAIN EQUALIZER

BACKGROUND OF THE INVENTION

One of the main problems in digital wireless communication system is the dispersive fading cause by multi-path propagation in transmission channels. Therefore high performance adaptive equalizers play a very important role in modern digital wireless communication systems to combat multipath fading. Inter symbol interference is one effect of multipath fading.

In a digital modem, the gain control signal can be derived directly from the received I F signal. This approach however lacks precision, especially in a selective fading environment. To improve the accuracy, Automatic Gain Control circuits are built based on decision-directed algorithms. Thus in order to have a valid and stable control for the Automatic Gain Control AGC circuit, it is required to wait for the synchronization loops (carrier/clock) and also the equalizer to stabilize. This process takes several symbol intervals before all the loops converge and increases the re-synch time.

Standard implementations of Adaptive Time Domain Equalization (ATDE), requires in order to eliminate inter symbol interference (ISI) only to adjust the side coefficients of the ATDE relative to the center tap coefficients. The center coefficients for the through- and cross-sections of the ATDE are normally set to 1 and 0, respectively. These coefficients are fixed and are not dynamic.

By using the present invention, an intermediate frequency (IF) automatic gain control can be used alone with the incorporated AGC in the ATDE circuit. This implementation has the advantage of reducing the re-synch time for the modem as well as capability of correcting I/Q amplitude and phase imbalance.

SUMMARY OF THE INVENTION

An object of the invention is an improvement for a method and apparatus for gain control. The method of gain control for a QAM signal in a communication system includes at least one digital modem. The improvement involving using a non-decision aided algorithm at the intermediate frequency level for coarse tuning and using a modified Adaptive Time Domain Equalizer (ATDE) to fine tune the level of the I/Q baseband signals and perform I/Q amplitude and phase imbalance correction along with a channel equalization.

Another object of the invention is a method of reducing re-synch time and I/Q amplitude and phase imbalance correction in a digital modem for a QAM signal. The method involving controlling the signal gain with a non-decision aided automatic gain controller to produce a baseband signal, and tuning the baseband signal in an Adaptive time domain equalizer utilizing non-fixed center tap coefficients.

Yet another object of the invention is an improvement for a method, in a communication system including at least one digital modem, for gain control for a QAM signal. The improvement comprising using a modified Adaptive Time Domain Equalizer (ATDE) to tune the level of the I/Q baseband signals and perform I/Q amplitude and phase imbalance correction along with channel equalization, wherein center tap coefficients are not fixed.

Per one embodiment, the present invention provides, in a communication system including at least one digital modem, a method of processing a quadrature amplitude modulation (QAM) signal, the method comprising coarse tuning inphase/quadrature baseband signals using a non-decision aided algorithm at the intermediate frequency level; and using a modified adaptive time domain equalizer (ATDE) to fine tune the inphase/quadrature baseband signals based on dynamic center tap coefficients having a range and to perform inphase/quadrature amplitude and phase imbalance correction. The center tap coefficients may be updated at least each symbol period. The ATDE may be internal to the digital modem. The coarse tuning may use peak detection. The communication system may be a cable network system, a point-to-point communication system, or a point-to-multipoint communication system. The communication system may operate in the millimeter wavelength spectrum. The communication system may be a time division multiple access system for communicating data in a frame format. The data density within each frame may be dynamically variable. The communication system may be a time-division duplex system. The communication system may be an adaptive time division duplex system. A forward/reverse ratio may be dynamically configurable.

Per one embodiment, the present invention provides a communication system with at least one digital modem for processing quadrature amplitude modulation (QAM) signals, wherein the at least one digital modem comprises an automatic gain controller for coarse tuning a baseband signal; and an adaptive time domain equalizer (ATDE) for fine tuning the baseband signal; wherein the ATDE modifies a dynamic center tap coefficient within a predetermined range. The ATDE may include a lowpass filter/accumulator and a limiter. The automatic gain controller may use peak detection. The communication system may be a cable network system, a point-to-point communication system, or a point-to-multipoint communication system. The communication system may operate in the millimeter wavelength spectrum. The communication system may be a time division multiple access system for communicating data in a frame format. The data density within each frame may be dynamically variable. The communication system may be a time-division duplex system. The communication system may be an adaptive time division duplex system. A forward/reverse ratio may be dynamically configurable.

Per one embodiment, a method of processing a quadrature amplitude modulation (QAM) signal comprises controlling the signal gain with a non-decision aided automatic gain controller to produce a baseband signal; and tuning the baseband signal in an adaptive time domain equalizer utilizing non-fixed center tap coefficients having boundaries.

Per one embodiment, the present invention provides, in a communication system including at least one digital modem, a method of processing a quadrature amplitude modulation (QAM) signal, the method comprising tuning inphase/quadrature baseband signals using a modified adaptive time domain equalizer (ATDE); and performing inphase/quadrature amplitude and phase imbalance correction, wherein center tap coefficients of said ATDE are not fixed.

These and many other objects and advantages of the present invention will be readily apparent to one skilled in the art to which the invention pertains from a perusal of the claims, the appended drawings, and the following detailed description.

DETAIL DESCRIPTION

Figure 1:
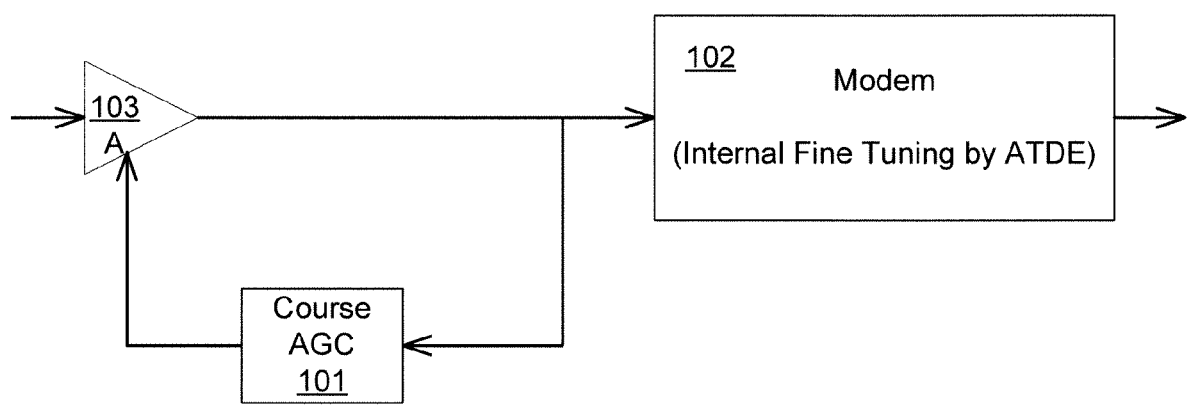
FIG. 1 is an embodiment of gain control with AGC and ATDE according to the present invention.

FIG. 1 is a representation of an embodiment of the invention. The automatic gain control 101 is a non-decision aided gain control that is used on the intermediate frequency signal for course gain control. Simple techniques that are known in the art can be employed by the AGC 101 such as peak detection or envelope detection. The AGC 101 supplies a gain control signal to the amplifier 103, which in turn amplifies the signal. The modem 102 operates using decision directed algorithms. Carrier recovery, timing recovery and base band AGC can be all controlled by using decision from the output of a modified ATDE system.

The modified ATDE system unlike prior solutions uses the center tap coefficients of the equalizer to fine tune the level of the baseboard signal before delivering it to the decision stage. The center tap coefficients are not fixed, rather they are dynamic and are updated as the equalization algorithm updates other coefficients. In order to protect the ATDE from divergence, an expected dynamic range for the fine tuning, the center coefficients are limited to a maximum and minimum value. These maximum and minimum values are predetermined and adjustable by the user. These values can be percentage deviations from the expected value, for example + or −5%. Because of the course tuning by the non-decision directed AGC, the range of center tap coefficients can be limited.

Figure 2:
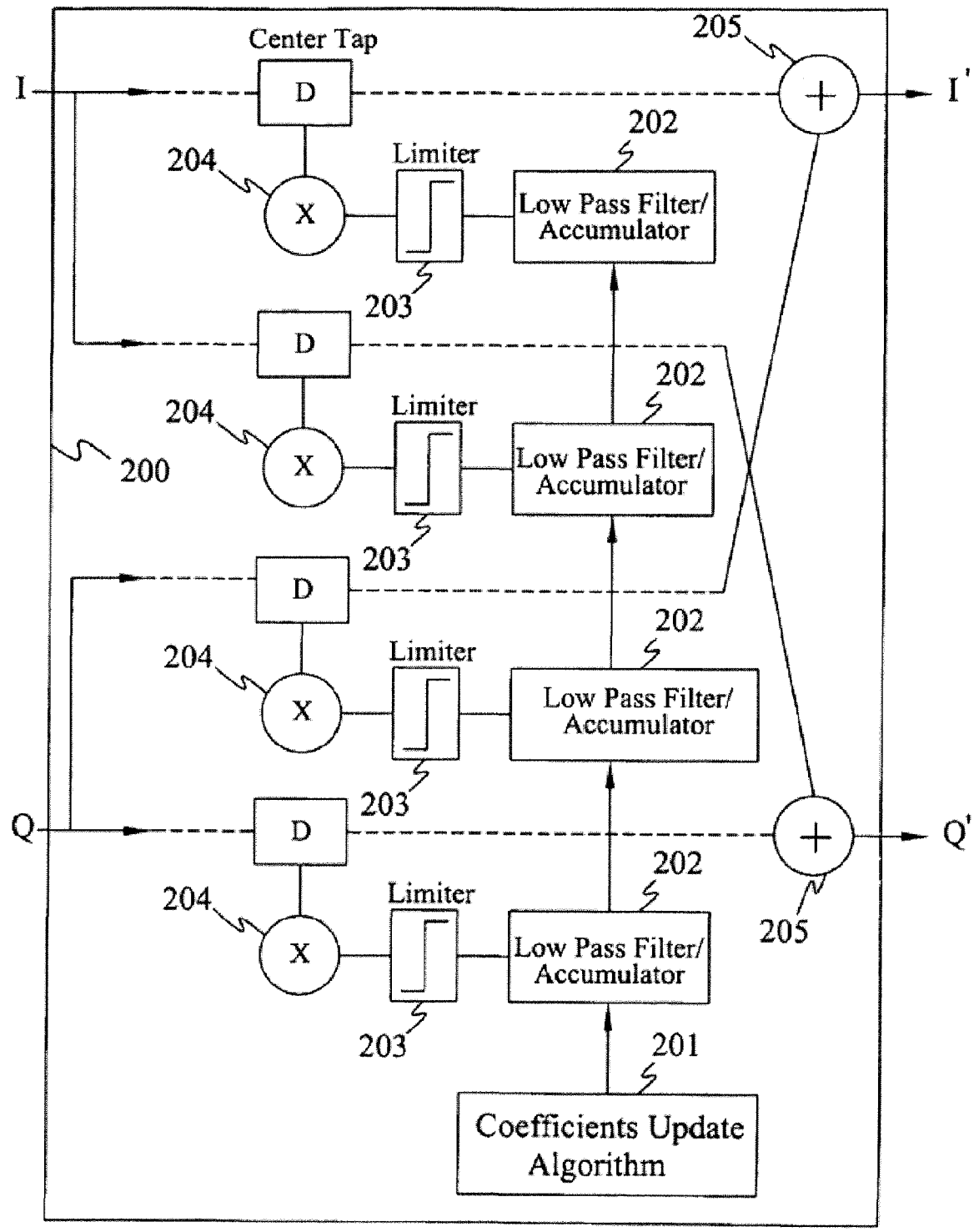
FIG. 2 is a representation of ATDE with dynamic center taps coefficient updating according to the present invention.

In FIG. 2, a portion of the ATDE 200 for dynamic modification of the center tap coefficients prior to the decision stage is shown. The coefficients update algorithm 201 updates the center tap coefficients in the same manner as the side coefficients. The type and methods of these algorithms are well known and are discussed in detail in Reeve, H. C. "Transversal Equalizer for Digital Radios" Globecom 1989, Conference Proceedings, Vol. 1 11.7.1-11.7.5, Nov. 27-30, 1989 and Yom et al. "A 55 Mbaud Single Chip Complex Adaptive Transversal Equalizer for Digital Wireless Communications Systems" Proceedings of the IEEE, 1997, pp.151-154, both of which are hereby incorporated herein by reference. The coefficients can be updated every symbol period or fractions of symbol periods. The output of the coefficient update algorithm 201 is supplied to a low pass filter 202 for each of the four taps. The low pass filter 202 or accumulator as used in digital systems operates on the coefficients and passes them to a limiter 203. The limiter 203 regulates the signal to prevent divergence with the user determined maximum and minimum values for the center tap coefficients. In extreme cases, the coefficients saturate to the maximum or minimum values. The resultant center tap coefficients are then applied to the center tap signal in multiplier 204.

The respective output of the tuned I/Q signals are cross added as is known in the art at adders 205, resulting in I' and Q' base band signals which proceed to the decision stage.

Figure 3:
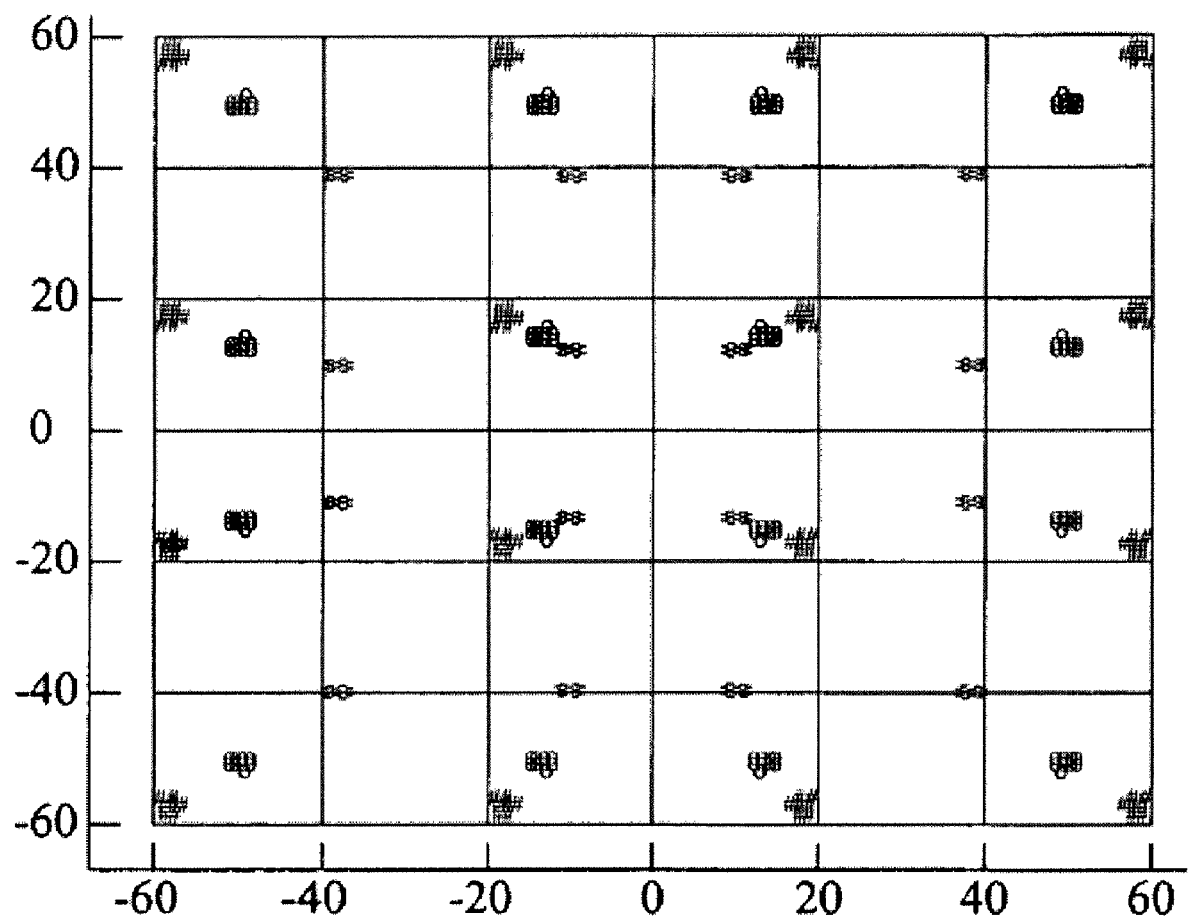
FIG. 3 is a QAM constellation with input and output symbols by the present invention

In FIG. 3, the results of simulated +/−2 dB deviation in the I/Q signal corrected by the output the modified ATDE are shown. The Quadrature Amplitude Modulation (QAM) constellation with a +2 dB change in the base band level is represented by "+", whereas the constellation with a −2 dB change in the base band level is represent by "*". The output of the modified ATDE is shown as "o". In both cases the ATDE was able to fine-tune the I/Q signals.

Figure 4:
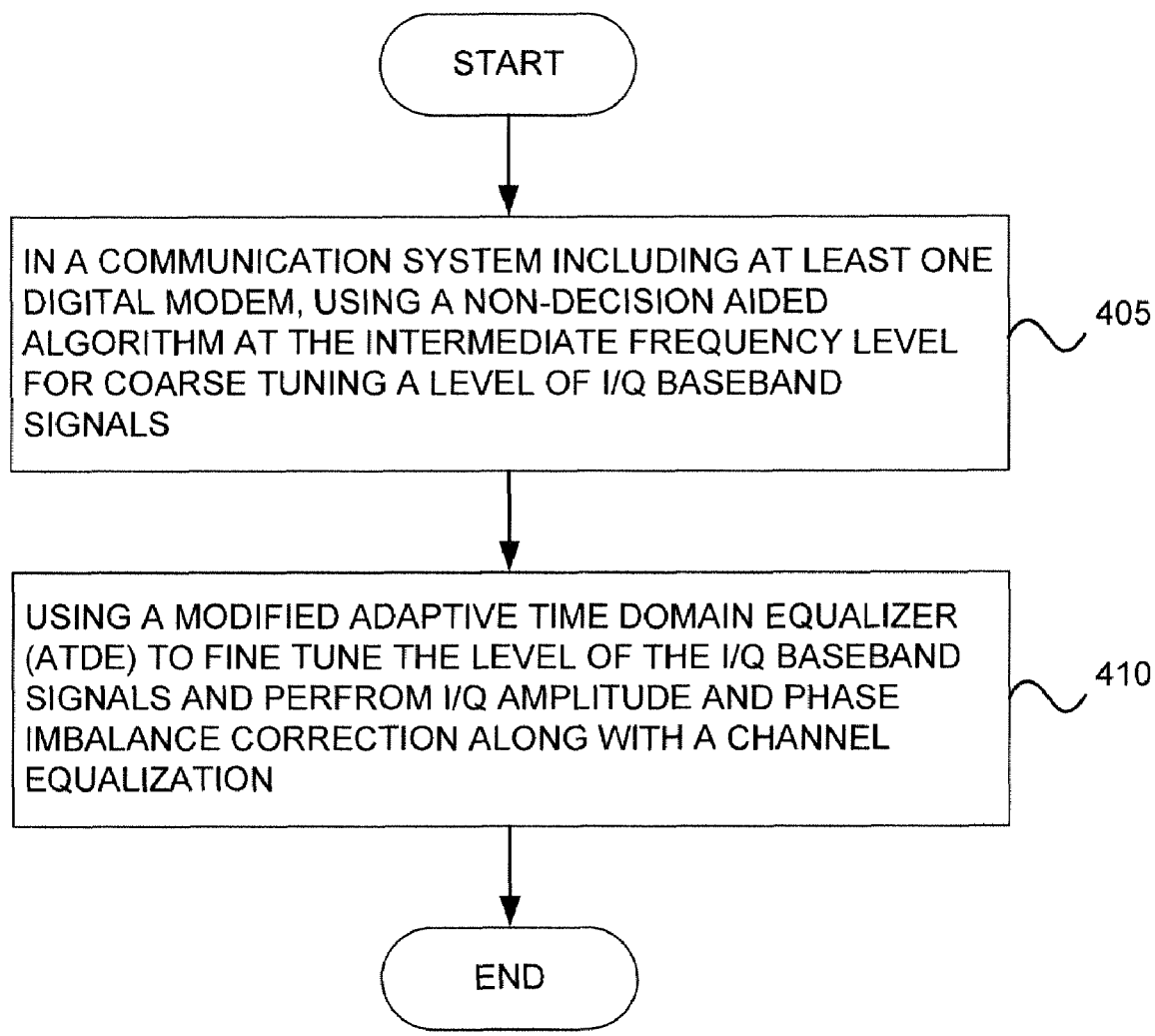
FIG. 4 is a flowchart illustrating a method of gain control for a QAM signal, in accordance with an embodiment of the present invention.

FIG. 4 is a flowchart illustrating a method of gain control for a QAM signal, in accordance with an embodiment of the present invention. The method begins in step 405 with using a non-decision aided algorithm at the intermediate frequency level for coarse tuning of a level of the I/Q baseband signals in a communication system including at least one digital modem. In step 410, the method uses a modified adaptive time domain equalizer (ATDE) to fine tune the level of the I/Q baseband signals and perform I/Q amplitude and phase imbalance correction along with a channel equalization.

Figure 5:
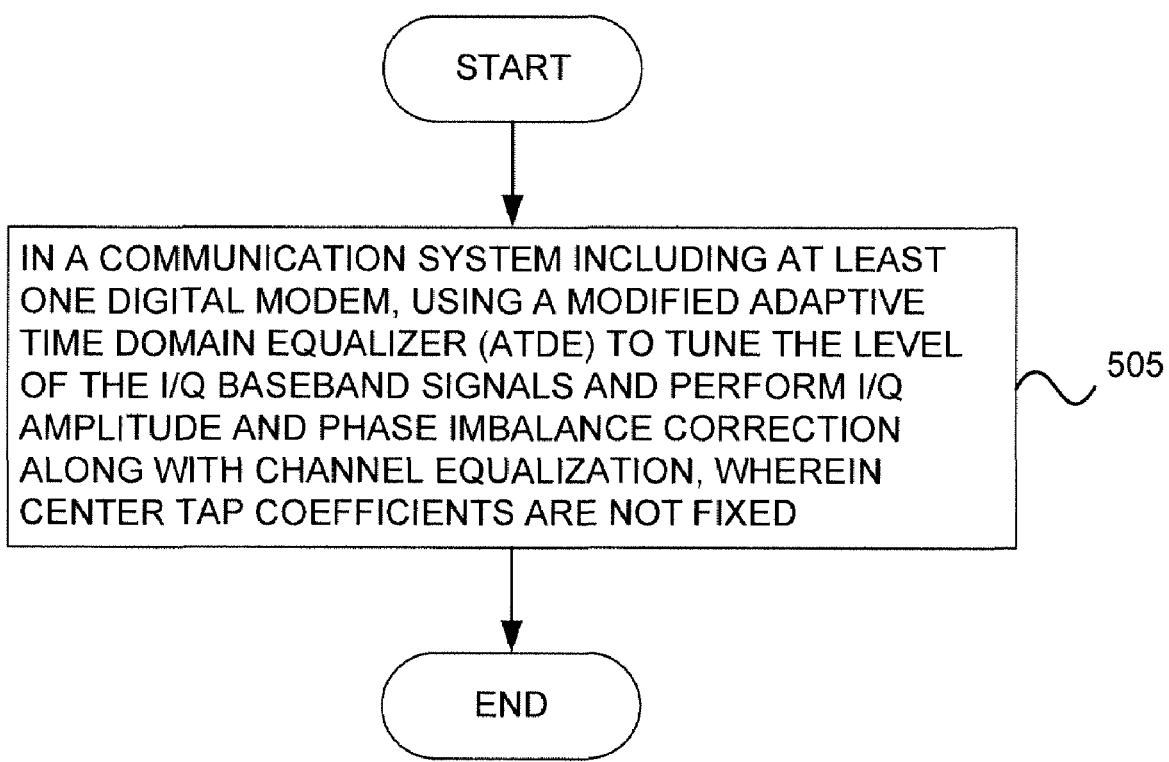
FIG. 5 is a flowchart illustrating a method of gain control for a QAM signal, in accordance with another embodiment of the present invention.

FIG. 5 is a flowchart illustrating a method of gain control for a QAM signal, in accordance with another embodiment of the present invention. The method includes using a modified ATDE to tune the level of I/Q baseband signals and perform I/Q amplitude and phase imbalance correction along with channel equalization, wherein center tap coefficients are not fixed.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. The present invention is not intended to be limited to the embodiments shown herein but is to be accorded the widest scope consistent with the principles and novel features disclosed herein.

I claim:

1. In a communication system including at least one digital modem, a method of processing a quadrature amplitude modulation (QAM) signal, the method comprising:

coarse tuning a received QAM signal using a non-decision aided gain controller at an intermediate frequency level, wherein inphase/quadrature baseband signals within the received signal having amplitudes defined by the coarse tuning;

fine tuning, using an adaptive time domain equalizer (ATDE), the inphase/quadrature baseband signals by changing dynamic center tap coefficients relative to at least one side coefficient to perform inphase/quadrature amplitude correction;

wherein the communication system is a point-to-multi-point communication system, wherein the communication system operates in the millimeter wavelength spectrum, wherein the communication system is a time division multiple access system for communicating data in a frame format, wherein the communication system is a time-division duplex system, and wherein fine tuning, using the ATDE, the inphase/quadrature baseband signals by changing dynamic center tap coefficients comprises filtering the dynamic center tap coefficients and limiting the filtered dynamic center tap coefficients.

2. A communication system with at least one digital modem for processing quadrature amplitude modulation (QAM) signals, wherein the at least one digital modem comprises:

an automatic gain controller for coarse tuning a received QAM signal; and an adaptive time domain equalizer (ATDE) for fine tuning inphase/quadrature baseband signals within the received QAM signal; wherein the ATDE modifies a dynamic center tap coefficient relative to at least one side coefficient within a predetermined range determined by user and defined by a limiter.

3. The communication system of claim 2, wherein the ATDE includes a lowpass filter/accumulator configured to receive the dynamic center tap coefficient and the limiter is configured to receive the dynamic center tap coefficient from the lowpass filter/accumulator, to limit the dynamic center tap coefficient, and to provide the limited dynamic center tap coefficient to a multiplier.

4. The communication system of claim 2, wherein the automatic gain controller uses peak detection.

5. The communication system of claim 2, wherein the communication system is a cable network system.

6. The communication system of claim 2, wherein the communication system is a point-to-point communication system.

7. The communication system of claim 2 wherein the communication system is a point-to-multipoint communication system.

8. The communication system of claim 7 wherein the communication system operates in the millimeter wavelength spectrum.

9. The communication system of claim 8 wherein the communication system is a time division multiple access system for communicating data in a frame format.

10. The communication system of claim 9 wherein a data density within each frame is dynamically variable.

11. The communication system of claim 9 wherein the communication system is a time-division duplex system.

12. The communication system of claim 11 wherein the communication system is an adaptive time division duplex system.

* * * * *